United States Patent [19]

Bennethum

[11] 4,443,336

[45] Apr. 17, 1984

[54] SURVIVAL AND WATER PURIFICATION SYSTEM

[76] Inventor: Mary L. Bennethum, 6790 Castle Dr., Birmingham, Mich. 48010

[21] Appl. No.: 432,682

[22] Filed: Oct. 4, 1982

[51] Int. Cl.³ .................................... B01D 27/02
[52] U.S. Cl. .................. 210/238; 210/282; 206/547; 222/189
[58] Field of Search ............ 210/120, 250, 282, 472, 210/477, 416.3; D3/30, 32; 141/379; 220/415; 222/131, 544, 189, 194, 94, 205; 99/323, 467; 426/66, 112, 410; 206/547, 217

[56] References Cited

U.S. PATENT DOCUMENTS

| | | | |
|---|---|---|---|
| 32,815 | 7/1861 | Arnold | 210/416.3 |
| 703,654 | 7/1902 | Hall | 210/416.3 |
| 1,528,680 | 3/1925 | Marcor, Jr. | 206/548 |
| 2,222,914 | 11/1940 | Pires | 222/189 |
| 2,436,077 | 2/1948 | Robertson | 210/416.3 |
| 2,566,371 | 9/1951 | Quinn | 210/416.3 |
| 3,224,586 | 12/1965 | Wade | 210/282 |
| 3,335,917 | 8/1967 | Knight | 222/189 |
| 3,536,197 | 10/1970 | Ward | 210/120 |
| 4,078,701 | 3/1978 | Clubb | 206/546 |
| 4,218,317 | 8/1980 | Kirschmann | 210/416.3 |
| 4,277,333 | 7/1981 | Coppola | 210/416.3 |

FOREIGN PATENT DOCUMENTS

| | | | |
|---|---|---|---|
| 2824 | of 1861 | United Kingdom | 210/416.3 |
| 563187 | 8/1944 | United Kingdom | 210/416.3 |

Primary Examiner—Charles N. Hart
Assistant Examiner—Wanda L. Millard
Attorney, Agent, or Firm—Harry R. Dumont

[57] ABSTRACT

A water purifying system unit that is portable, fabricated of durable parts and makes provision for storage of basic survival needs in addition to water. A double chamber unit with bag and filter with separating filter and storage compartment provides three stage filtration of water. An appropriate mouthpiece makes drinking directly from the unit possible.

10 Claims, 3 Drawing Figures

SURVIVAL AND WATER PURIFICATION SYSTEM

BACKGROUND OF THE INVENTION

1. Field of the Invention

This invention relates to a portable water purifying and filtering unit in which the dirty and possibly contaminated water is forced by simple manual pressure through the unit as it is needed for use.

2. Description of the Prior Art

Prior art devices for water filtering are known which are of the bag type usable for removing impurities from a given quantity of liquid. Generally these bags are hung at a stationary position and the untreated water is allowed to seep by gravity flow through a intermediate filter and into a lower part of the bag from which it is taken into other vessels for use. This type of filter is shown in U.S. Pat. No. 3,224,586 issued on Dec. 21, 1965 to K. L. Wade for "Bag Assemblage". Another gravity type of water filter is shown in U.S. Pat. No. 3,536,197 issued to Samuel L. Ward on Oct. 27, 1970 for "Liquid Treating Apparatus". Much of the prior art development has been concerned with relatively high volume filtration. The present invention on the other hand is directed towards provision of a highly efficient low volume filter that is itself portable and easily carried by the user as he moves about. It is particularly designed for use by outdoorsmen, backpackers, and the like.

SUMMARY OF THE INVENTION

The present invention has the object of overcoming filtration problems with portable filters that satisfy the need for producing potable water to be carried and used in the field. It has the further object of incorporating in one filter device a convenient receptacle for carrying a radio transmitter or the like to provide a finder signal in the event the device is needed in a survival environment. Alternately, the receptacle can be used for storing matches, lighters, or other compact emergency materials that might be essential for survival in the field.

The present invention has as its components several light and flexible elements that resist damage even with rough usage and keep the essential elements for survival at hand. A mounting arrangement is provided for shoulder mounting to leave the hands free.

BRIEF DESCRIPTION OF THE DRAWINGS

The present invention will now be described with reference to the accompanying specification and the drawings in which like numerals are used to identify like parts as they appear throughout the different views and in which.

DETAILED DESCRIPTION OF THE PREFERRED EMBODIMENT

Figure 1:
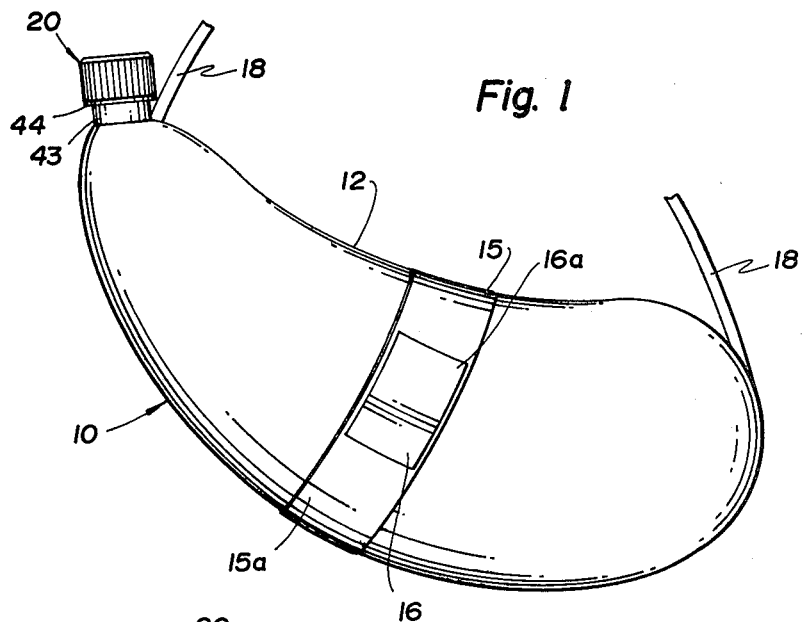
FIG. 1 is a perspective external view with parts broken away showing the filter.
Figure 2:
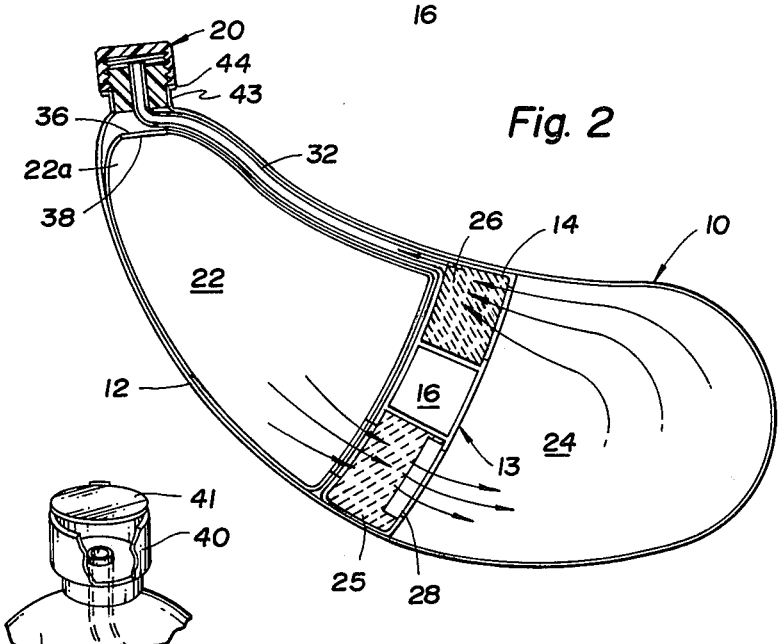
FIG. 2 is a sectional view of the device showing its internal parts.

As shown in FIGS. 1 and 2 the unit 10 includes a flexible outer bag 12 having a removable, separate, rigid central portion 13 which is clamped in place by an external clamp or strap 15 that contains the intermediate filter 14 as well as a central receptacle 16 with snap cover 16a for holding radio transmitter, matches, or other essential survival materials. The shoulder strap 18 is connected as shown to permit ready portability of the device. The upper end of the container is closed by a cap 20 that is clamped in place by strap 43 and removable when necessary.

FIG. 2 shows the detail of the two chambers into which the unit 10 is generally divided. At the upper lefthand end there is a chamber 22, while at the lower righthand end there is a second chamber 24. The chamber 22 is preferably embodied as a bag 22a with an upper Velcro opening 38 in which the untreated water and chemicals are placed. The bag 22a is placed in the chamber 22 through a top opening 44 in the bag 12. The bag 22 chemically treats the water and also filters it as the water passes through the bag 22a by gravity and squeezing. The opening 44 is normally clamped shut about the cap 20 by the clamp 43 as best shown in FIG. 1. The opening 44 preferably has incorporated in it an elastic band designed to stretch open and receive the bag 22 in its full and distended condition. The rigid center portion 13 includes the central receptacle 16 referred to in connection with FIG. 1. Two separate filter elements are included which include a lower fine filter element 25 and an upper charcoal filled element 26. Incorporated in the lower filter 25 is a one-way check valve 28 which permits flow of the liquid in the direction indicated by arrow. An ascending tube 32 communicates between the outlet of element 26 and the upper end of the cap 20. It will also be seen that the chamber 22a has an opening at its upper end indicated by the numeral 36 that is used to receive dirty and possibly contaminated water. Preferably, and for convenience the upper end of the bag 22a is opened by the Velcro fastener 38. The fine filter 25 preferably includes a fine silt and bacterial filter element. The filter element used in the final filter stage 26 is a silver-anodized charcoal purifying element. All of the parts of the filter unit within the bag 12 are flexible with the exception of the rigid central portion 13 which consists of element 14 and the enclosed receptacle 16 which is removable and separate from bag 12. The bag 12 and the lower chamber 24 are preferably lined with a silver metallic material. It will be seen that the uncovering of opening 44 at the top of the bag 12 is through removal of the upper clamp or strap 43.

Figure 3:
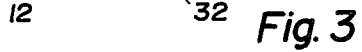
FIG. 3 is a view with parts broken away showing an alternate embodiment to be used as a mouthpiece.

FIG. 3 shows an alternate embodiment of the filter cap which includes an upper drinking cup 40 in which the tube 32 carrying the filtered water upwardly terminates. The upper cup thus replaced the cap 20 of FIG. 1. It is held in place by the strap 43. A snap cap 41 can be used over the cup 40 if desired. With this arrangement, it is possible for the user to filter small amounts of the water at a time and to drink it straight from the cup without requiring any drinking vessel.

METHOD OF OPERATION

The unit 10 is first filled by insertion of the bag 22a filled with the water to be purified through the opening 44 of the bag 12. The upper chamber 22 is then compressed by manual squeezing to force the water through the filter 25 and outwardly through the check valve 28 into the lower chamber 24. In the last step, the lower bag or chamber 24 is manually squeezed and the purified water is forced outwardly through the charcoal filled element 26 and up through the tube 32 where it can be poured into an external vessel. If the embodiment of FIG. 3 is used, it can be forced upwardly through the tube 32 into the available drinking cup 40 for immediate use. As shown in FIGS. 1 and 2, the central receptacle 16 for storing emergency materials preferably has a sliding cover 16a so that it can be opened and closed to a water tight condition without affecting the other elements in the filter. The external strap 15a is shown that encircles the unit 10 at its midsection. The upper strap 43 is shown at the upper end of the unit to which is attached to the upper end of the carrying strap 18. The other end of the carrying strap 18 can be attached by sewing or other means to the bottom of the bag 12.

It will thus be seen that I have provided by my invention a novel and improved survival and filter system that operates even in a hostile environment in a simple and reliable fashion. It is both portable and simple to operate.

I claim:
1. A portable filter unit, comprising;
   an outer flexible container including a top;
   an upper compartment of flexible material enclosed in said container;
   a lower compartment of flexible material enclosed in said container;
   a tube communicating between said lower compartment and the upper end of said container and including an upper end and a lower end;
   a rigid filter means mounted in said container intermediate said compartment; and
   a filter means including a pair of separate filter units, one communicating between said upper and lower compartments and the other between the lower compartment and the lower end of said tube, respectively.

2. The combination as set forth in claim 1 wherein a separate receptacle is included in said rigid filter means for receiving and holding a survival material.

3. The combination as set forth in claim 2 wherein said receptacle had mounted on it a slidable cover for closing it in a watertight condition.

4. The combination as set forth in claim 1 wherein said tube upper end is connected to a stopper fixed in said container top.

5. The combination as set forth in claim 1 wherein an open cup is mounted in said container top, said tube upper end terminating in said cup.

6. The combination as set forth in claim 1 including an open ended cup and wherein said tube terminates at its upper end at the bottom of said cup for providing potable water directly to the user for drinking.

7. The combination as set forth in claim 1 wherein a first one-way check valve is mounted in said filter means communicating between said upper and lower compartments for insuring flow of water therebetween responsive to compression of the upper compartment.

8. The combination as set forth in claim 1 wherein said upper compartment comprises a removable bag, said bag including an opening and an associated Velcro fastener at its upper end for receiving water to be filtered.

9. The combination as set forth in claim 2 wherein said survival material comprises a radio transmitter.

10. The combination as set forth in claim 2 wherein said survival material comprises matches.

* * * * *